(No Model.)

W. S. PLUMMER.
DRYING CHAMBER FOR FRUIT EVAPORATORS.

No. 261,036. Patented July 11, 1882.

WITNESSES:
Thos. Houghton.
Edw. W. Byrn.

INVENTOR:
W. S. Plummer
BY
ATTORNEYS.

UNITED STATES PATENT OFFICE.

WILLIAM S. PLUMMER, OF SAN JOSÉ, CALIFORNIA.

DRYING-CHAMBER FOR FRUIT-EVAPORATORS.

SPECIFICATION forming part of Letters Patent No. 261,036, dated July 11, 1882.

Application filed April 13, 1882. (No model.)

*To all whom it may concern:*

Be it known that I, WILLIAM S. PLUMMER, of San José, in the county of Santa Clara and State of California, have invented a new and Improved Drying-Chamber for Fruit-Evaporators; and I do hereby declare that the following is a full, clear, and exact description of the same, reference being had to the accompanying drawings, forming part of this specification, in which—

Figure 1:
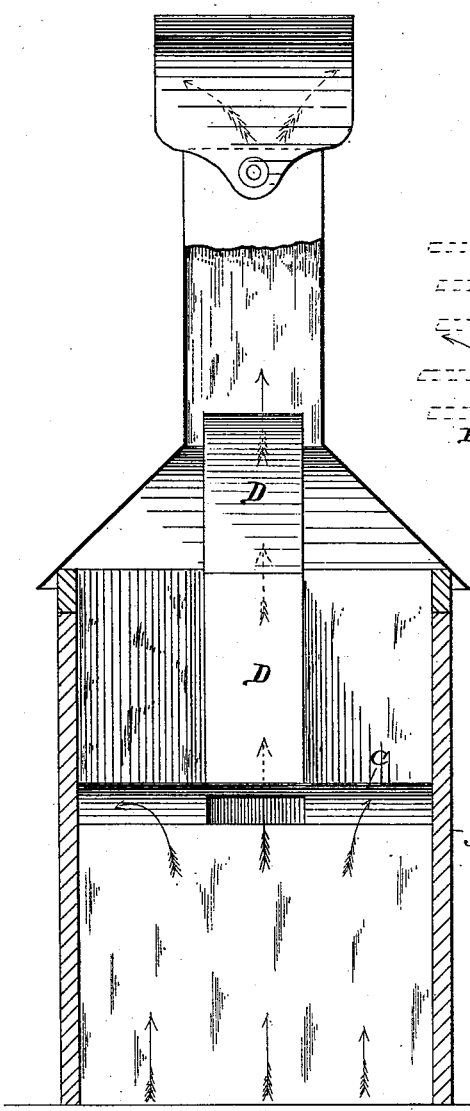
Figure 3:
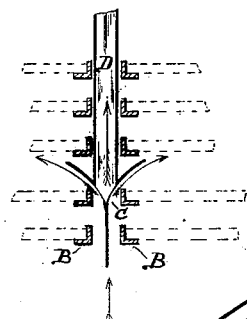
Figure 2:
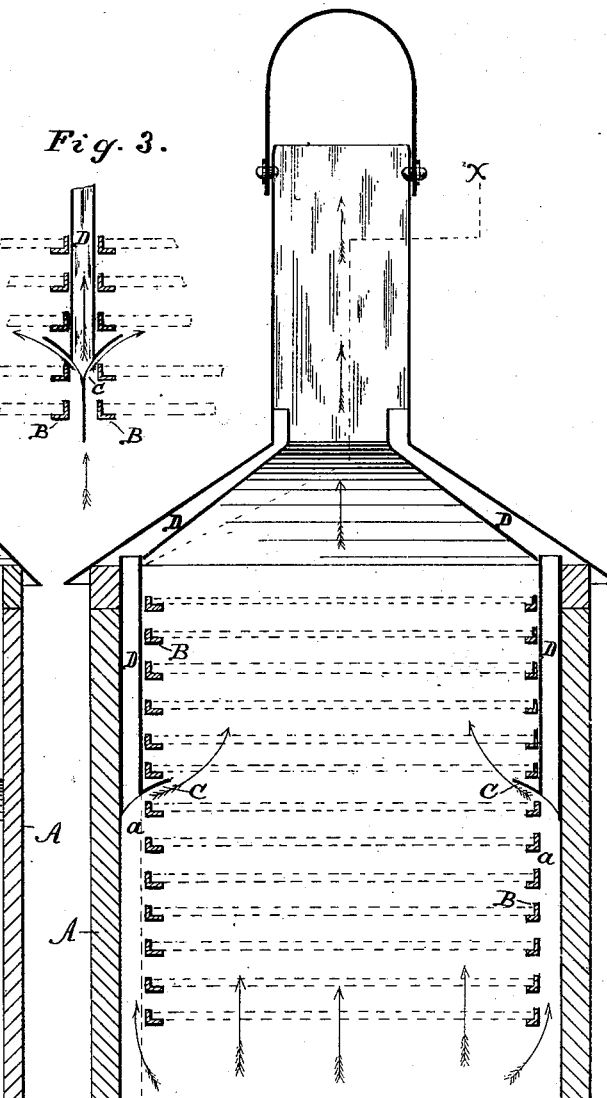

Figure 1 is a section through the broken line $x$ $x$ of Fig. 2. Fig. 2 is a central vertical cross-section at right angles to the view exhibited in Fig. 1. Fig. 3 is a detail showing a modification of my invention.

My invention relates to an improvement in the construction of the drying-chamber for fruit-evaporators, and its object is to so divide and direct the bulk of hot air ascending from the heater that it will cause the fruit in the series of trays near the top to be dried uniformly with the fruit in those at the bottom, and also stimulate the draft, so as to cause the rapid clearance of the heavy vapor-laden air from the drier.

To this end my improvement consists in locating in the vertical spaces at the edges of the trays a curved deflector and combining therewith a tube which opens below the deflector, the deflector serving to throw a portion of the hot dry air ascending at the edges of the trays under the upper portion of the trays to facilitate the drying of the fruit thereon, while another portion of this hot air, ascending at the edges of the trays, is carried by the tube up into the escape-flue and creates an active draft, as will be more fully described hereinafter.

In the drawings, A represents the outer casing of the drying-chamber, provided with a metal cover, preferably of sheet metal, and a hooded escape-flue.

B represents a series of flanges or tray-seats, which are secured at their ends to the framework of the drier, and are arranged a short distance from the sides of the drier, so as to leave an air-space, $a$, between. Extending from side to side of the drying-chamber, parallel with the tray-seats and near the middle or below the upper set of trays, are deflector-plates C C, which are attached to the walls of the drier and curve inwardly across the air-space $a$ and between the tray-seats B. Extending upwardly from said deflectors and opening through them are the two flat tubes D D. These tubes extend up into the escape-flue, and their function is to take a part of the hot dry air in the space $a$ and carry it directly to the said flue, where it quickens the draft and secures the rapid clearance from the fruit of the heavy vapors that rise from the same. The object of the deflectors is to take a portion of the dry hot air and pass it through the upper section of trays, which would otherwise be slower in drying in consequence of their remoteness from the heater and the passage of the heavy vapors through them from the fruit beneath. By deflecting a portion of the hot air which rises at the sides of the trays under and through the upper trays this difficulty is remedied, while the carrying of a portion of said hot air up through tubes D to the escape-flue to quicken the draft very greatly hastens the drying action and increases the efficiency of the drying-chamber.

I am aware of the fact that it is not new to use the deflectors for diverting a portion of the air in space $a$ beneath and through the upper trays, and I therefore only claim the combination of the tubes D with said deflector and the tray-seats.

Instead of using a single set of trays and placing the deflectors and tubes D between the tray-seats and the wall of the drier, as in Figs. 1 and 2, I may in larger drying-chambers use several vertical stacks of trays, and locate the deflectors and the tube between said stacks of trays, as shown in Fig. 3. This may be employed either alone or in conjunction with the arrangements shown at the sides, as in Figs. 1 and 2.

Having thus described my invention, what I claim as new is—

1. The combination, with the series of tray-seats and the walls of the drying-chamber, of the deflector-plates C and tubes D, arranged to take the hot air in the spaces outside the tray-seats and divert it partly underneath the upper sets of trays and carry the balance to the escape-flue to quicken the draft and secure the rapid clearance of the heavy vapors from the fruit, as described.

2. The combination, with two or more vertical stacks of trays having an air-space between them, of the double deflector C, Fig. 3, and the tube D, opening below the same and extending up between the stack of trays, as shown and described.

The above specification of my invention signed by me in the presence of two subscribing witnesses.

WILLIAM S. PLUMMER.

Witnesses:
   EDWD. W. BYRN,
   SOLON C. KEMON.